United States Patent
Swistun et al.

[11] Patent Number: 5,740,613
[45] Date of Patent: Apr. 21, 1998

[54] TRIMMING DEVICE WITH ERGONOMIC HANDLE BAR

[75] Inventors: Helmut Swistun, Kernen; Gerhard Stoll, Winnenden; Martin Lambe, Kernen, all of Germany

[73] Assignee: Andreas Stihl, Waiblingen, Germany

[21] Appl. No.: 691,265

[22] Filed: Aug. 2, 1996

[30] Foreign Application Priority Data

Aug. 2, 1995 [DE] Germany .................. 195 28 358.9

[51] Int. Cl.$^6$ .................................. A01D 34/68
[52] U.S. Cl. ................ 30/276; 30/296.1; 30/312
[58] Field of Search ....................... 30/276, 279.4, 30/296.1, 312, 318, 340, DIG. 5; 16/111 R, 112; 56/12.7; D8/8

[56] References Cited

FOREIGN PATENT DOCUMENTS 3521685  2/1986  Germany .
3731326  3/1988  Germany .

Primary Examiner—Rinaldi I. Rada
Assistant Examiner—Clark F. Dexter
Attorney, Agent, or Firm—Robert W. Becker & Associates

[57] ABSTRACT

A trimmer has a drive motor, a cutting tool, and a drive shaft connecting the drive motor and the cutting tool. A protective tube encloses the drive shaft. A connector is provided for connecting a handle bar, having a first and a second section, to the protective tube. The first and second sections are parallel to one another, and the first section is connected to the protective tube. The first section has a free end with a first handle and the second section has a free end with a second handle. The handle bar is positioned asymmetrically relative to the longitudinal axis of the protective tube. The handle bar has a bent portion, with a first and a second bend, connecting the first and second sections. The bent portion is positioned adjacent to the connector. In the operating position of the trimmer, the longitudinal axis of the second section is displaced relative to the longitudinal axis of the first section along the longitudinal axis of the protective tube.

8 Claims, 3 Drawing Sheets

TRIMMING DEVICE WITH ERGONOMIC HANDLE BAR

BACKGROUND OF THE INVENTION

The present invention relates to a trimming device or trimmer comprising a drive motor, a cutting tool, and a drive shaft connecting the drive motor to the cutting tool. The drive shaft is enclosed in a protective tube. A handle bar for manipulating the trimmer is provided which is connected with a connector to the protective tube whereby the handle bar is arranged asymmetrically to the longitudinal axis of the protective tube and is provided at its respective ends with handles.

From German Offenlegungsschrift 37 31 326 a cutting device is known which is comprised of a drive motor, a cutting tool, and a drive shaft connecting the drive motor and the cutting tool which drive shaft is enclosed by a protective tube. For manipulating the trimmer, brackets are connected to the protective tube having angular ends that serve as handles. In the known arrangement the brackets extend from the connecting element at the protective tube at a right angle to the longitudinal axis of the protective tube and have a bend in the direction of the drive motor, i.e., in the direction toward the operator. Such an arrangement however results in that the connecting element for the handles must be arranged at the protective tube so as to be displaced toward the cutting tool in order not to limit too much the freedom of movement required by the operator for manipulating the device. On the other hand, certain minimal distances between the cutting tool and the point of connection of the handles are required.

It is therefore an object of the present invention to provide a trimmer of the aforementioned kind which provides simple means for improving manipulation of the device.

SUMMARY OF THE INVENTION

The trimmer according to the present invention is primarily characterized by:

A drive motor;

a cutting tool;

a drive shaft for connecting the drive motor and the cutting tool;

a protective tube enclosing the drive shaft;

a connector;

the handle bar having a first and a second section, the first section extending parallel to the second section, the first section connected with the connector to the protective tube;

the first section having a free end with a first handle and the second section having a free end with a second handle;

the handle bar positioned asymmetrically relative to a longitudinal axis of the protective tube; and the handle bar having a bent portion comprising a first and a second bend between the first and second sections, the bent portion positioned adjacent to the connector;

wherein in an operating position of the trimmer, the longitudinal axis of the second section is displaced relative to a the longitudinal axis of the first section.

Expediently, the handle bar is a single tubular member and the free ends extend substantially in the same direction.

Advantageously, the bent portion comprises a connecting section between the first and second bends, the connecting section extending at a first angle of 50° to 80° to a longitudinal axis of the first and second sections of the handle bar.

Advantageously, the first angle is 60°.

Expediently, the distance between the longitudinal axis of the first section and the longitudinal of the second section is approximately 120 mm.

Advantageously, the longitudinal axis of the connecting section is positioned at a second angle to the longitudinal axis of the second handle. Preferably, the second angle is 20°.

Advantageously, the first and the second handles are displaced in the longitudinal direction of the protective tube by approximately 40 mm due to the distance between the longitudinal axis and due to the second angle.

The essential advantages of the inventive trimmer are to be seen in that the shape of the handle bar provides for a greater degree of freedom for the legs of the operator so that the operator can safely move with the device and is not impeded in his movement by the device. Furthermore, a greater degree of freedom in the pivoting direction about a vertical axis is provided so that the movements of the operator about the longitudinal axis of his body allows for a greater pivot angle to be performed with the trimmer.

According to a preferred embodiment of the invention the handle bar comprises a unitary tubular member the ends of which are substantially bent in the same direction. These bent ends are provided with handles, whereby preferably one of the handles is provided with the throttle lever for controlling the rpm of the drive motor, i.e., the rpm of the cutting tool.

In order for the material of the handle bar in the area of the bent portion not to be negatively influenced too greatly, especially when the handle bar is comprised of a grip tube, a preferred embodiment suggests that the connecting section between the first and second bends is positioned at an angle of 50° to 80° relative to the longitudinal axis of either one of the first and second sections of the handle bar. Preferably, the angle is 60°. In order to provide the operator with a corresponding freedom of movement for his legs and freedom of movement for manipulating the device with a simultaneous ergonomic arrangement of the handles, the distance between the longitudinal axis of the first and second sections of the handle bar is 120 mm.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of a specific embodiment utilizing FIGS. 1 through 4.

Figure 1:
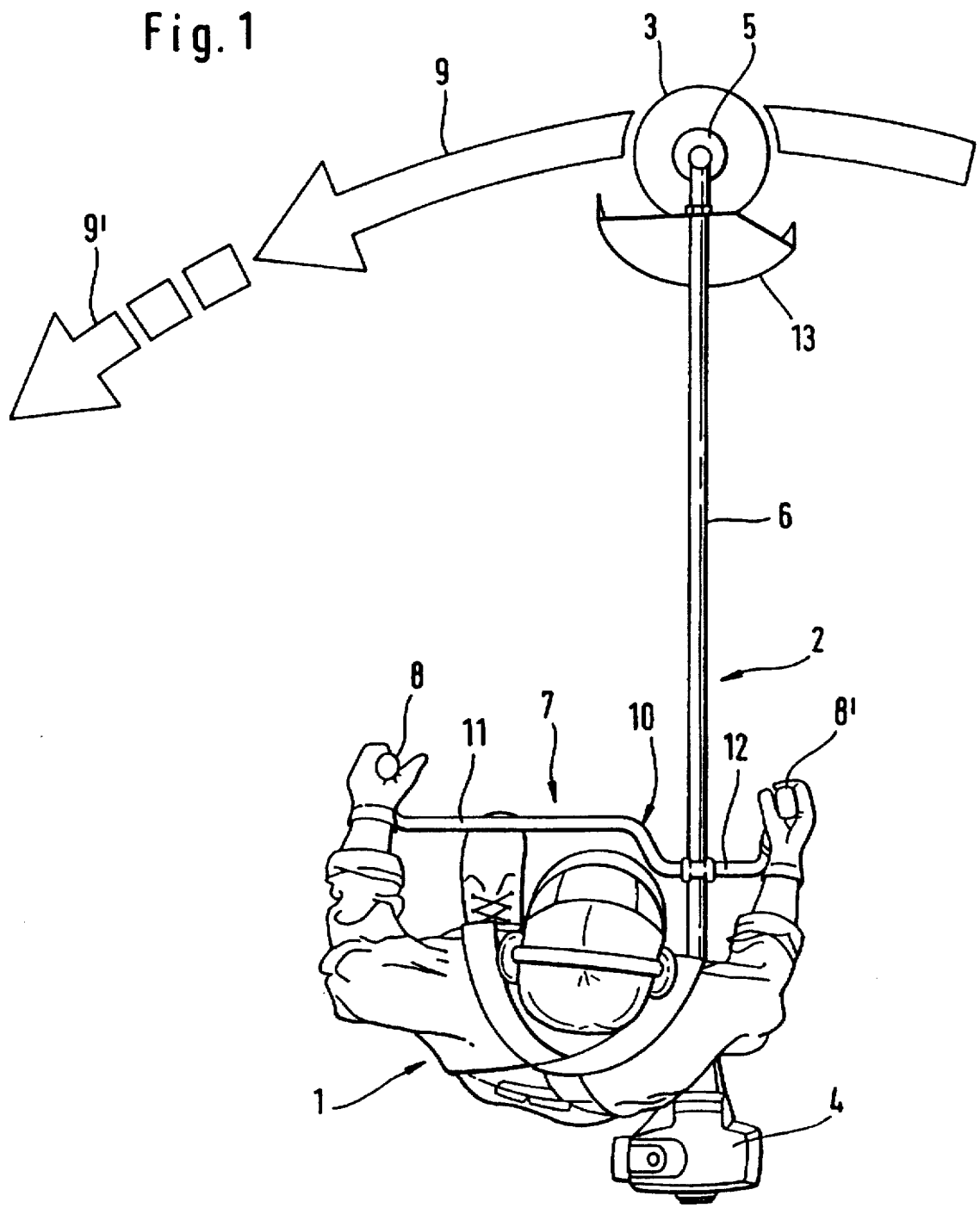
FIG. 1 is a plan view of an operator guiding an inventive trimmer.

FIG. 1 shows a plan view of a trimmer 2 guided by an operator 1. The trimmer 2 comprises a drive motor 4, a cutting tool 3, which is rotatably supported at an angular gear 5, as well as a drive shaft enclosed in a protective tube 6 which drive shaft extends between the drive motor 4 and the angular gear 5. The end of the protective tube 6 facing the angular gear 5 is provided with a protective shield 13.

For manipulating the trimmer 2, a handle bar 7 is provided which is connected to the protective tube 6 and which is preferably comprised of a light-weight metal tube. The handle bar 7 is asymmetrically arranged at the protective tube 6 whereby a section 11 extending to the left has a greater length than a section 12 extending to the right of the protective tube 6. At the respective free ends 14, 14' of the handle bars 7, handles 8 and 8' are provided which due to the asymmetric arrangement are in a position which can be reached by the operator 1 with substantially identical positioning of the arms. In the vicinity of the point of connection of the handle bar 7 to the protective tube 6, the handle bar 7 is provided with a bent portion 10 between the first and second sections 11 and 12 so that for the left section 11 a displacement in the manner of a crank relative to the section 12 is provided. In this manner, the distance between the section 11 of the handle bar 7 and the operator 1 is greater than would be the case for a straight handle bar or a handle bar with only one bend. Thus, a greater freedom for the legs of the operator as well as a greater pivot angle for the trimmer 2 is provided. This is indicated by the additional arrow 9' in comparison to the conventional pivot angle indicated by arrow 9.

Figure 2:
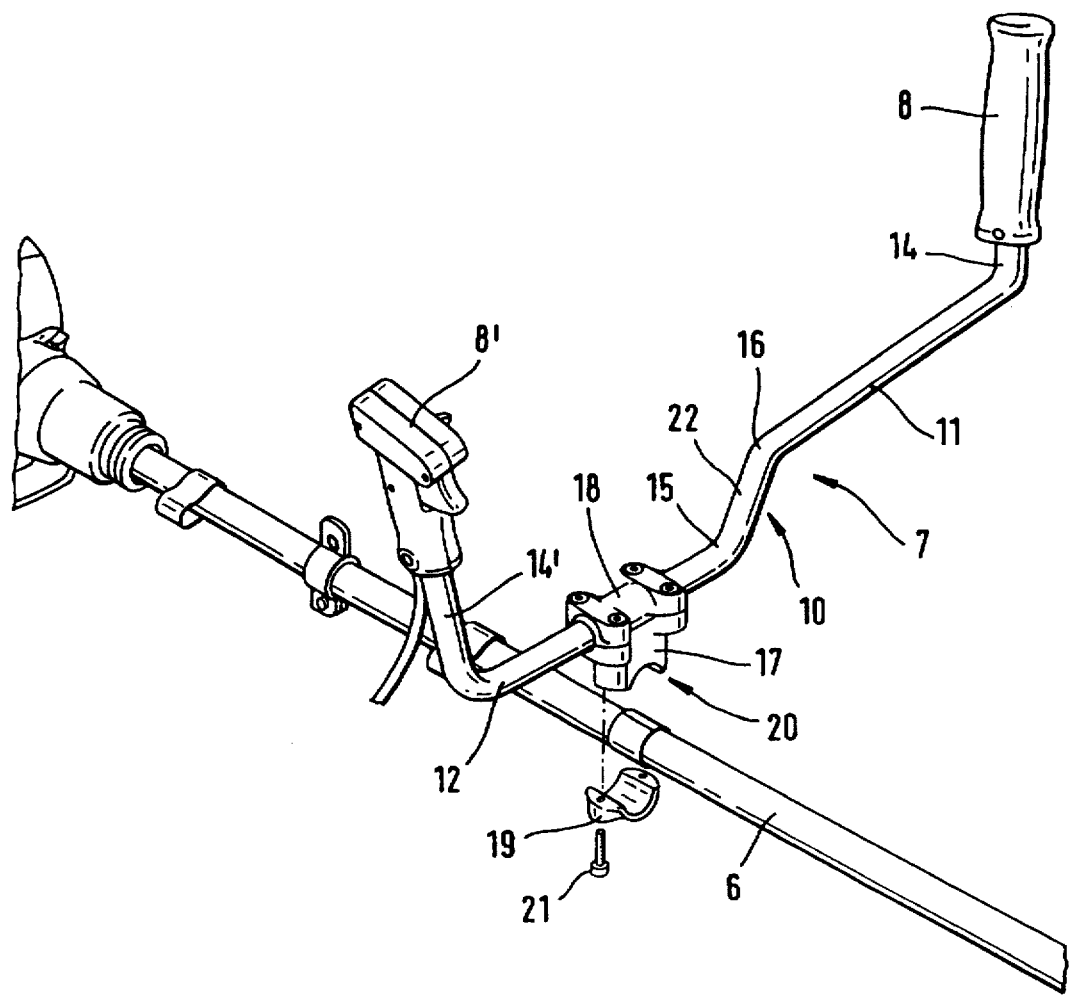
FIG. 2 is a perspective view of the handle bar with connector for connecting the handle bar to the protective tube.

FIG. 2 shows a perspective view of the handle bar 7 which is connected with a connector 20 to the protective tube 6. The connector 29 comprises a support 17 formed such that it surrounds the protective tube 6 in a half circle and a lower clamping part 19 that is connected with screws 21 to the support 17 so that the protective tube 6 is clamped between the clamping part 19 and the support 17. The handle bar 7 is clamped with its section 12 between the support 17 and the upper clamping part 18 whereby screws are provided for fastening as has been disclosed in connection with the lower clamping part. In the vicinity of the connector 20, the handle bar 7 has a bent portion 10 connecting parallel sections 11 and 12, wherein the bent portion is comprised of a first bend 15 and a second bend 16 and a connecting section 22. Due to this double bend arrangement 15, 16 with connecting section 22 a crank-like embodiment of the handle bar 7 between the parallel sections 11 and 12 is provided. As will become clear in the following, the bent portion 10 extends from the longitudinal axis of the section 12 at a slant in the upward direction. The sections 11 and 12 are provided with angled free ends 14, 14' extending substantially in the same direction to which ends the handles 8, 8' are connected.

Figure 3:
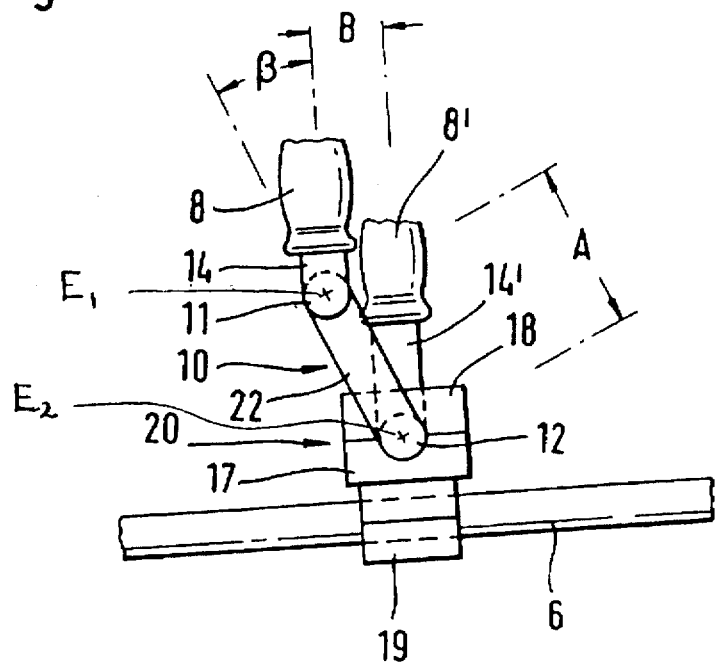
FIG. 3 is a side view of the handle bar connected to the protective tube.

FIG. 3 shows a side view of the handle bar viewed from the left. The connector 20 comprised of the support 17 and the two clamping parts 18 and 19 is arranged at the protective tube 6. Between the support 17 and the upper clamping part 18 the section 12 of the handle bar 7 is clamped and due to the bent portion 10 a displacement of the section 11 relative to the section 12 results. The longitudinal axis of section 11 of the handle bar 7 is indicated with reference numeral $E_1$ in FIG. 3 while the longitudinal axis of section 12 of the handle bar 7 is indicated with reference numeral $E_2$. The distance between the longitudinal axes $E_1$ and $E_2$ is indicated with reference numeral A.

As can be seen also in FIG. 3, the longitudinal axis of the section 22 is positioned at an angle $\beta$ of approximately 20° relative to the longitudinal axis of the handle 8. This angle $\beta$ as well as the distance A between the longitudinal axes $E_1$ and $E_2$ determines the displacement of the handles 8 and 8' in the longitudinal direction of the protective tube 6. This displacement is indicated with reference numeral B and is preferably approximately 40 mm. Due to the crank-shaped bent portion 10 of the handle bar 7 the handle 8 is in a position which, relative to the operator, is farther forward and farther upward than the handle 8' as can be seen especially in the representation of FIG. 3. In this manner a substantially identical arm position for the operator can be achieved. The operator will position both hands at substantially the same level when manipulating the trimmer 2 so that the trimmer 2 will be tilted to the left by a slight rotation about the longitudinal axis of the protective tube 6 in a counterclockwise direction. In this manner, the material that has been trimmed or cut is automatically deposited at the rearward end of the pivot range.

Figure 4:
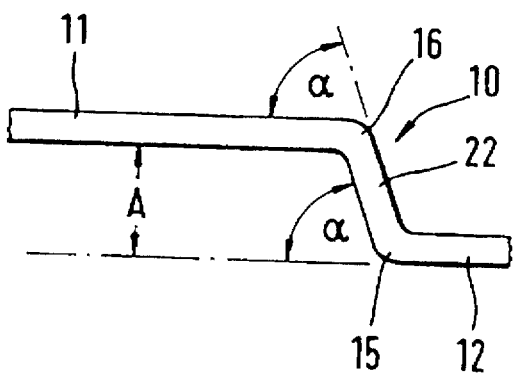
FIG. 4 is a detailed view of the handle bar in the area of the bent portion.

As is shown in FIG. 4, the first bend 15 adjacent to the section 12 and the second bend 16 completing the bend portion 10 have substantially the same angle $\alpha$ to the longitudinal direction of the sections 11 and 12 of the handle bar whereby this angle is approximately 60°. The distance A between the longitudinal axes defined by the sections 11 and 12 can be of different magnitude and is preferably of approximately 120 mm.

The present invention is, of course, in no way restricted to the specific disclosure of the specification and drawings, but also encompasses any modifications within the scope of the appended claims.

What we claim is:

1. A trimmer comprising:
    a drive motor;
    a cutting tool;
    a drive shaft connecting said drive motor to said cutting tool;
    a protective tube enclosing said drive shaft;
    a connector;
    a handle bar having a first and a second section extending parallel to one another, said first section connected by said connector to said protective tube so as to extend perpendicular to said protective tube;
    said first section having a first free end extending therefrom with a first handle on said first free end and said second section having a second free end extending therefrom with a second handle on said second free end;
    said handle bar positioned asymmetrically relative to a longitudinal axis of said protective tube;
    said handle bar having a bent portion, comprising a first and a second bend, connecting said first section to said second section, said bent portion positioned adjacent to said connector;
    wherein, in an operating position of said trimmer, said first section and said first free end define a first plane and said second section and said second free and define a second plane, and wherein said first plane is displaced relative to said second plane in a direction of said longitudinal axis of said protective tube.

2. A trimmer according to claim 1, wherein said handle bar is a single tubular member and wherein said first and second free ends extend substantially in the same direction relative to one another.

3. A trimmer according to claim 1, wherein said bent portion further comprises a connecting section between said first and second bends, said connecting section extending at a first angle in a range of 50° to 80° to a direction a of longitudinal axis of either one of said first and second sections of said handle bar.

4. A trimmer according to claim 3, wherein said first angle is approximately 60°.

5. A trimmer according to claim 3, wherein the first and second sections each has a longitudinal axis, and a distance between the longitudinal axis of said first section and the longitudinal axis of said second section is approximately 120 mm.

6. A trimmer according to claim 5, wherein a longitudinal axis of said connecting section is positioned at a second angle to a longitudinal axis of said second handle.

7. A trimmer according to claim 6, wherein said second angle is approximately 20°.

8. A trimmer according to claim 6, wherein said first and said second handles are displaced relative to one another in a longitudinal direction of said protective tube by approximately 40 mm due to said distance and due to said second angle.

* * * * *